(12) United States Patent
Zhou et al.

(10) Patent No.: US 9,400,922 B2
(45) Date of Patent: Jul. 26, 2016

(54) FACIAL LANDMARK LOCALIZATION USING COARSE-TO-FINE CASCADED NEURAL NETWORKS

(71) Applicant: Beijing Kuangshi Technology Co., Ltd., Beijing (CN)

(72) Inventors: Erjin Zhou, Beijing (CN); Haoqiang Fan, Beijing (CN); Zhimin Cao, Beijing (CN); Yuning Jiang, Beijing (CN); Qi Yin, Beijing (CN)

(73) Assignee: Beijing Kuangshi Technology Co., Ltd., Beijing (CN)

( * ) Notice: Subject to any disclaimer, the term of this patent is extended or adjusted under 35 U.S.C. 154(b) by 0 days.

(21) Appl. No.: 14/375,674

(22) PCT Filed: May 29, 2014

(86) PCT No.: PCT/CN2014/078814
§ 371 (c)(1),
(2) Date: Jul. 30, 2014

(87) PCT Pub. No.: WO2015/180100
PCT Pub. Date: Dec. 3, 2015

(65) Prior Publication Data
US 2015/0347822 A1 Dec. 3, 2015

(51) Int. Cl.
*G06K 9/00* (2006.01)
*G06T 1/00* (2006.01)
*G06T 7/00* (2006.01)

(52) U.S. Cl.
CPC ........ *G06K 9/00248* (2013.01); *G06K 9/00281* (2013.01); *G06T 1/0007* (2013.01);
(Continued)

(58) Field of Classification Search
CPC . G06K 9/00221; G06K 9/66; G06K 9/00228; G06K 9/00288; G06K 9/00281; G06K 9/00248
USPC ......... 382/118, 156, 155, 168, 255, 263, 264, 382/274, 275
See application file for complete search history.

(56) References Cited

U.S. PATENT DOCUMENTS

| 8,582,807 B2 * | 11/2013 | Yang | G06K 9/00248 382/103 |
| 2011/0143811 A1 * | 6/2011 | Rodriguez | G06K 9/00986 455/556.1 |

(Continued)

OTHER PUBLICATIONS

Sun, Y. et al., "Deep Convolutional Network Cascade for Facial Point Detection," The Chinese University of Hong Kong, eight pages. Jun. 23-28, 2013.*

(Continued)

*Primary Examiner* — Sheela C Chawan
(74) *Attorney, Agent, or Firm* — Fenwick & West LLP (57) ABSTRACT

The present invention overcomes the limitations of the prior art by performing facial landmark localization in a coarse-to-fine manner with a cascade of neural network levels, and enforcing geometric constraints for each of the neural network levels. In one approach, the neural network levels may be implemented with deep convolutional neural network. One aspect concerns a system for localizing landmarks on face images. The system includes an input for receiving a face image, and an output for presenting landmarks identified by the system. Neural network levels are coupled in a cascade from the input to the output for the system. Each neural network level produces an estimate of landmarks. The estimate of landmarks is more refined than an estimate of landmark of a previous neural network level.

20 Claims, 6 Drawing Sheets

(52) U.S. Cl.
CPC .............. *G06T 7/003* (2013.01); *G06T 7/0022* (2013.01); *G06T 7/0081* (2013.01); *G06T 7/0085* (2013.01); *G06T 2207/10004* (2013.01); *G06T 2207/20016* (2013.01); *G06T 2207/20084* (2013.01); *G06T 2207/30201* (2013.01)

(56) References Cited

U.S. PATENT DOCUMENTS

2011/0222724 A1* 9/2011 Yang .................. G06K 9/00248
382/103

2015/0170002 A1* 6/2015 Szegedy .................. G06K 9/66
382/156

OTHER PUBLICATIONS

Milborrow, S. et al., "Locating Facial Features with an Extended Active Shape Model," Department of Electrical Engineering, University of Cape Town, South Africa, eleven pages.

Sun, Y. et al., "Deep Convolutional Network Cascade for Facial Point Detection," The Chinese University of Hong Kong, eight pages.

* cited by examiner

FACIAL LANDMARK LOCALIZATION USING COARSE-TO-FINE CASCADED NEURAL NETWORKS

FIELD OF THE INVENTION

This invention relates generally to image processing and, more particularly, to face recognition using machine learning.

DESCRIPTION OF THE RELATED ART

Face recognition systems perform image processing on digital images or video frames to automatically identify people. Face recognition systems may perform facial landmark localization for face analysis. The performance of some face recognition approaches may depend heavily on the landmarks identified in face images. However, facial landmark localization is difficult because of the large variation of facial appearance due to the changes in pose, lighting, expression, etc. Facial landmark localization is even more challenging when a large number of landmark points are desired.

In one approach, a single model is implemented to perform facial landmark localization. However, this approach is usually unsuitable for producing numerous landmark points which may vary dramatically from one face to the next. In particular, it can be difficult to localize each landmark point. For example, while there may be abundant local context to facilitate the detection of an eye corner, determining the exact position of a point on the cheek is in some cases non-trivial even for humans.

In another approach, an individual system is implemented for each landmark point to perform facial landmark localization. However, implementing a separate individual system for each facial point suffers from long computation time, because computational burden grows proportionally with the number of landmarks. In addition, expensive iterative steps may be employed to estimate the parameters for each individual system.

Thus, there is a need for better approaches to facial landmark localization, for face recognition and other purposes.

SUMMARY

The present invention overcomes the limitations of the prior art by performing facial landmark localization in a coarse-to-fine manner with a cascade of neural network levels. The neural network levels may be implemented by deep convolutional neural networks.

One aspect concerns a system for localizing landmarks on face images. The system includes an input for receiving a face image, and an output for presenting landmarks identified by the system. Neural network levels are coupled in a cascade from the input to the output. Each neural network level produces an estimate of landmarks that, preferably, is more refined (i.e., more accurate) than that of the previous neural network level.

In one approach, geometric constraints for the neural network levels are enforced to implement the coarse-to-fine cascade. For example, for each neural network level, inputs to the neural network level might be a same size or larger than outputs for the neural network level. In one approach, an input to the neural network level is a clip of a face image with a first bounding box, and an output for the neural network level is a clip of the face image with a second bounding box. The first bounding box is a same size or larger than the second bounding box. Preferably, the second bounding box is a subset of the first bounding box.

In an example implementation, the first (i.e., coarsest) neural network level receives a face image as input to the neural network level. This neural network level produces a cropped face image as output. The next neural network level receives the cropped face image and produces a landmarked face image containing an initial prediction of landmarks within the face image. The next neural network level decomposes the landmarked image of the entire face into landmarked component images. Each landmarked component image contains a refined estimate of an individual landmark. The next neural network level produces a rotated version of the landmarked component image.

In another aspect, the landmarks include inner points and outer points. The inner points define landmarks within a face of the face image. For example, the inner points define the eyes, mouth, and nose. The output points define a contour of the face of the face image.

Other aspects of the invention include components, devices, systems, improvements, methods, processes, applications and other technologies related to the foregoing.

BRIEF DESCRIPTION OF THE DRAWINGS

The invention has other advantages and features which will be more readily apparent from the following detailed description of the invention and the appended claims, when taken in conjunction with the accompanying drawings, in which:

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

A disclosed facial recognition system (and method) includes facial landmark localization. The facial landmarks render representations of faces or portions of the faces for a computing machine (e.g., computer) to identify faces or the portions of the faces. The facial landmark localization is obtained by training multiple cascaded neural network levels. Each of the neural network levels is trained to refine a subset of facial landmarks (herein also referred to as landmarks) generated by previous levels. The levels operate in a coarse-to-fine manner, becoming more localized and accurate further down the cascade. In one approach, each of the neural network levels predicts explicit geometric constraints. Facial landmark localization performed with the cascade of neural network levels and geometric constraints can lead to improvement in accuracy, computation efficiency, and robustness against local corruptions.

Preferably, landmarks for the neural networks are divided into inner points and outer points (herein also referred to as contour points). Inner points are landmarks defining regions within a face of the face image. For example, the inner points may define the eyes, mouth, eye brows and nose. Outer points are landmarks defining a contour of a face of the face image. For example, a contour is around a cheek.

Face Recognition Overview

Figure 1:
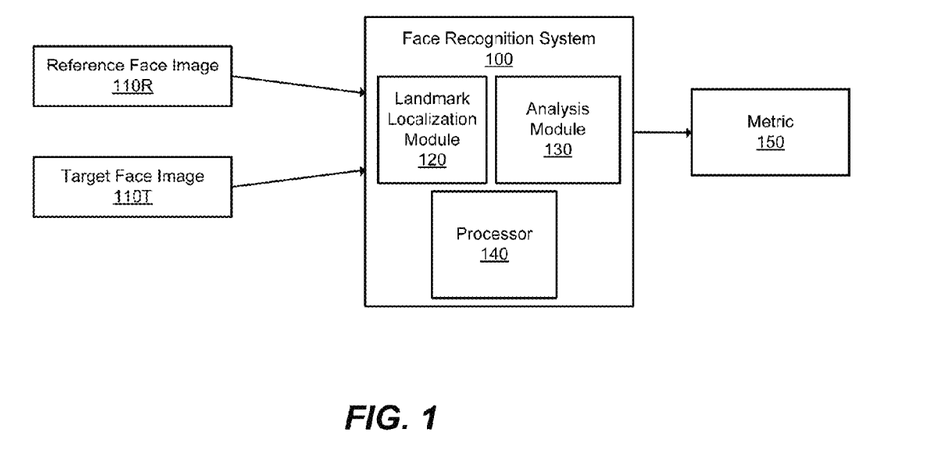
FIG. 1 is a simplified diagram of a face recognition system.

FIG. 1 is a simplified diagram of a face recognition system 100, according to one embodiment. The face recognition system 100 receives a target face image 110T and tries to recognize the face (i.e., associate the face with a specific individual). The face recognition system 100 also receives a reference face image 110R for a known individual. The face recognition system 100 performs analysis to generate a metric 150 to indicate whether the individual in the target face image 110T is the same as the individual in the reference face image 110R. The face recognition system 100 may have a large database of reference face images 110R for different individual and may compare the target face image 110T to many different reference face images 110R in order to identify the individual for the target face image 110T.

The face recognition system 100 includes landmark localization module 120, an analysis module 130, and a processor 140. Each of these modules may be embodied as hardware, software, firmware, or a combination thereof. Together, these modules perform face recognition and determine whether the subjects in two face images 110 are identical or not.

The landmark localization module 120 receives the face images 110 as inputs and localizes landmarks of the face images 110. The landmark localization module 120 initially estimates landmarks and refines the estimation to improve accuracy. In one approach, the landmark localization module 120 exploits geometric refinements to generate landmarks through cascaded stages. The landmark localization module 120 may generate landmarked face images (including landmarked portions of a face image).

The analysis module 130 determines whether a subject in the reference face image 110R and a subject in the target face image 110T match. The analysis module 130 obtains the landmarks of the face images 110 from the landmark localization module 120. For face images that were previously available, landmark localization may be processed in advance, in which case the analysis module 130 may retrieve the landmarks from a database. Further, the analysis module 130 generates metric 150 on whether the face images 110 belong to the same subject (person) based on the landmark representations of the face images 110. The metric 150 can be used to perform face recognition. Examples of metrics include cosine of the angle between the landmark representations or the Euclidean distance between different landmark representations.

The processor 140 executes instructions to perform face recognition on the face recognition system 100. The processor 140 receives instructions from memory (not shown), or external circuitry. The instructions may also reside, completely or at least partially, within the processor 140 (e.g., within a processor's cache memory). According to the instructions, the processor 140 transforms or selects a portion of the face images 110 to provide to the landmark localization module 120. In addition, the processor 140 operates the landmark localization module 120 and the analysis module 130 according to the instructions to perform core functions of the face recognition.

Landmark Localization

Figure 2:
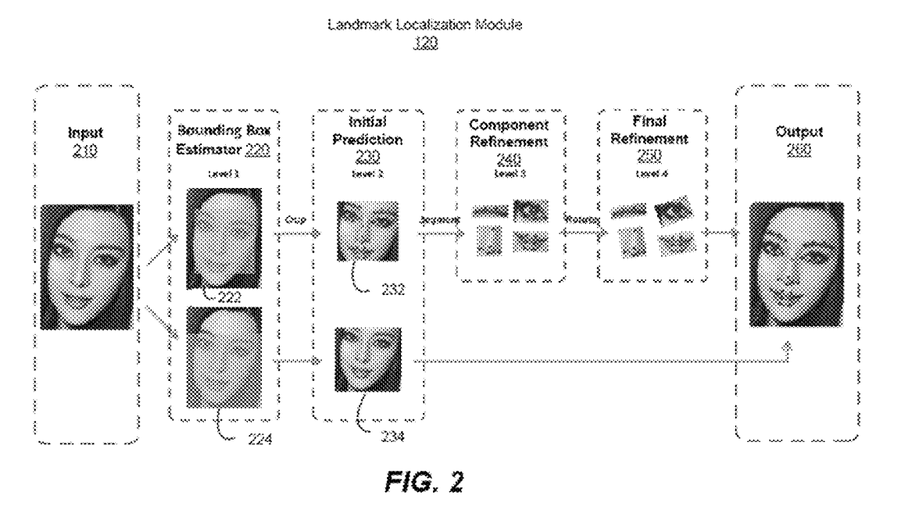
FIG. 2 is a diagram of an example landmark localization module.

FIG. 2 is a diagram of an example landmark localization module 120. This landmark localization module 120 trains cascaded neural networks to localize landmarks on a face of a face image 110. In one embodiment, the landmark localization module 120 decomposes localization task into multiple stages. For example, the landmark localization module 120 divides facial landmarks into inner landmarks and the face contour. Further, the landmark localization module 120 identifies many different inner landmarks—for example, eyes, eyebrows, mouth, and nose. The landmark localization module 120 uses two separate cascades of neural networks for the inner landmarks and for the face contour, respectively. In this example, the cascade for inner landmarks includes four neural network levels, while the cascade for the face contour includes two neural network levels. By separating the localization of inner landmarks and the contour parts, the landmark localization module 120 can separately optimize the landmark localization of the inner landmarks and of the face contour.

As illustrated in FIG. 2, the landmark localization module 120 includes an input 210, bounding box estimators 220, initial prediction modules 230, component refinement module 240, final refinement module 250, and output 260. The bounding box estimator 220, initial prediction 230, component refinement 240 and the final refinement 250 form cascaded neural networks. Preferably, each network is implemented as a convolutional neural network. Each neural network filters irrelevant information from a previous level, and trains the neural networks to refine the landmark localization. Each of these modules may be embodied as hardware, software, firmware, or a combination thereof. Together, these modules train neural networks to localize landmarks in face images 110.

The input 210 of the landmark localization module 120 receives face images 110 to perform landmark localization. The input 210 may directly receive face images (or portion of face images) 110 without any processing. Alternatively, the input 210 may receive processed face images 110 (or portions of face images 110). In one aspect, the input 210 includes a queue for receiving multiple face images 110 and provides a face image 110 to perform landmark localization to the bounding box estimator 220.

The bounding box estimator 220 receives the face image 110 and produces two bounding boxes: one bounding box 222 for the inner landmarks and another bounding box 224 for the face contours. Accordingly, the bounding box estimator 220 trains two neural networks to estimate these two bounding boxes (i.e., the maximum and minimum value of the x-y coordinates). The bounding box estimator 220 computes the relative position of the face contour, which is closely related to the pose of the face. The bounding box estimator 220 may also generate cropped face images estimating a location of a face within the face image 110 based on the bounding box 222 for the inner landmarks or the bounding box 224 for the face contour. In some systems, the bounding box estimator 220 may also generate landmarked face images containing the initial prediction of landmarks within the face image 110, although that is not the case for the system shown in FIG. 2.

The initial prediction module 230 receives the cropped face images 222, 224 from the bounding box estimator 220 and performs initial landmark estimation. The module 230 also has separate neural networks for the inner landmarks and for the face contour. In the top row of FIG. 2, the initial prediction module 230 makes an initial estimate 232 of inner landmark points defining the different inner landmarks: mouth, nose, eyes and eyebrows. In the bottom row of FIG. 2, the initial prediction module 230 makes an initial estimate 234 of the landmark points defining the face contour. Note that for both the inner landmarks and for the face contour, the localization is performed for the entire face.

In contrast, the component refinement module 240 refines the landmark localization on a component by component basis. It receives the landmarked face images 232 for the inner landmarks and further refines landmark localization of the inner landmarks, considering each inner landmark separately. The component refinement module 240 segments a face into facial components (eyes, eyebrows, mouth and nose). Moreover, the component refinement module 240 refines the landmark localization of each facial component separately. The component refinement module 240 produces landmarked component images, as shown in FIG. 2.

The final refinement module 250 receives the landmarked component images from module 240 and further refines and finalizes the landmark localization of the inner points. In this example, the final refinement module 250 rotates the components such that the inner landmarks are in a normalized orientation. The final refinement module 250 estimates rotation angle of each facial component and corrects the position of each facial component accordingly. The final refinement module 250 may also further refine the estimate of the inner points.

In the example of FIG. 2, the component refinement module 240 and the final refinement module 250 are performed for the inner landmarks but not for the face contour. That is, a larger number of neural network levels is implemented for computing landmarks for the inner landmarks (i.e., inner points) than for the face contour (i.e., outer points).

Training neural networks for each level in the bounding box estimator 220, initial prediction 230, component refinement 240 and the final refinement 250 is preferably performed with geometric constraints. For example, the localization task is decomposed into multiple stages at each of which the interaction between the points or components is considered. In the first level, the relative position of the face contour, which is closely related to the pose of the face, is computed. In higher levels, more detailed information is revealed step by step. The second level network learns the relative location of the facial components, and the task of recognizing the shape inside a component is handled by succeeding levels. Position and rotation angles of a specific facial component are computed based on relative position to another facial component.

The output 260, receives refined landmarked face images for the inner landmarks from the final refinement module 250 and for the face contour from the initial prediction module 230. The inner and outer points are combined to generate output representations for the landmark localization module 120. In one approach, the inner landmarks are represented by 51 landmark points, and the face contour is represented by 17 landmark points.

By localizing the inner landmarks and the face contour separately, both parts are optimized more efficiently. Because the contour is on the boundary between a face and a background in the face image, irrelevant information from the background introduces ambiguity and more noise. In contrast, the inner landmarks are less susceptible to noise or irrelevant information. As a result, localizing the inner landmarks and the face contour together leads to imbalanced localization. By dividing a face into the inner landmarks and the face contour, training two separate cascaded subsystems enables the whole system to learn the detailed structure of inner landmarks in a computationally efficient manner without devoting most of the computing capacity to fitting the difficult contour parts.

Preferably, for each neural network level, an input to the neural network level is a clip of the face image 110 with a first bounding box, and an output for the neural network level is a clip of the face image 110 with a second bounding box. For example, the size of the first bounding box is same or larger than the size of the second bounding box. Further, the second bounding box may be a subset of the first bounding box.

Convolutional Neural Network (CNN)

Figure 3:
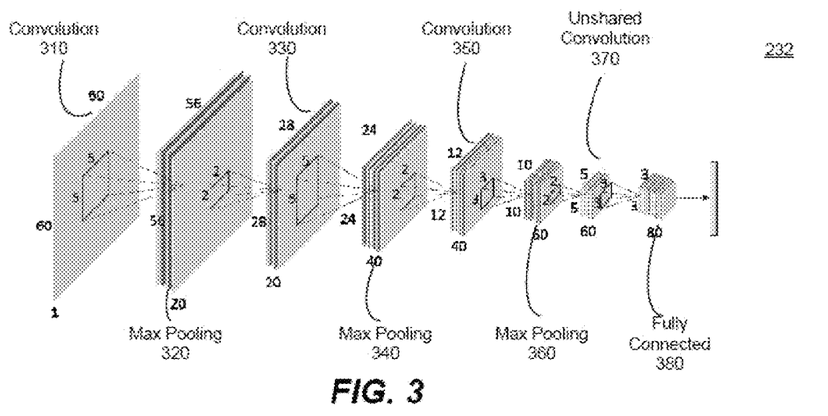
FIG. 3 is a diagram of a neural network level implemented by a cascaded convolutional neural network.

In one embodiment, the landmark localization module 120 is implemented by cascaded convolutional neural networks (CNN). FIG. 3 is a diagram of a neural network level (specifically, module 232) implemented by a cascaded convolutional neural network. In this example, the convolutional neural network implementing initial prediction level 2 includes three convolutions 310, 330, 350 and three max-pooling 320, 340, 360. Each convolution is followed by max-pooling. The convolutional neural networks also include non-linear operators. This neural network level further includes unshared convolution 370 followed by a fully connected network 380. For the unshared convolution, the weights used in different positions are different.

Three convolution operations 310, 330, 350 are stacked after the input nodes. Each convolutional layer applies several filters to the multichannel input image and outputs the responses. Let the input to the t-th convolutional layer be $I^t$, then the output is computed according to $$C_{i,j,k}^t = \left| \tanh\left( \sum_{x=0}^{h_t-1} \sum_{y=0}^{w_t-1} \sum_{z=0}^{c_t-1} I_{i-x,j-y,z}^{t-1} \cdot F_{x,y,k,z}^t + B_k \right) \right| \quad (1)$$

where I represents the input to the convolutional layer, and F and B are tunable parameters. Hyper-tangent and absolute value function are applied to the filter responses to introduce non-linearity to the system.

Max-pooling 320, 340, and 360 with non-overlapping pooling regions is used after convolution 310, 330, 350.

$$I_{i,j,k}^t = \max_{0 \leq x < d, 0 \leq y < d}(C_{i \cdot d+x, j \cdot d+y, k}^t) \quad (2)$$

Although the max-pooling operation may introduce error terms and degrade accuracy in the computation, the robustness of the cascaded neural network compensates for the loss of information in the pooling operation. Because the overall shape and relative position of the landmarks are more important than the pixel level detail in the input image, inaccuracy from the max-pooling operation becomes insignificant.

In the unshared convolution 370, the filter applied is not the same across different positions, so the layer is local-receptive rather than convolutional.

$$C_{i,j,k} = \left| \tanh\left( \sum_{x=0}^{h-1} \sum_{y=0}^{w-1} \sum_{z=0}^{c-1} I_{i-x,j-y,z} \cdot F_{i,j,x,y,k,z} + B_{i,j,k} \right) \right| \quad (3)$$

The final prediction is produced by one or two fully connected layers. Parameters are adjusted to minimize the L2 (i.e., least squares error) loss:

$$\sum_{I^0} |layer_m \circ layer_{m-1} \circ \ldots \circ layer_1(I^0) - label(I^0)|_2^2 \quad (4)$$

FIG. 3 shows the sizes of the various data and operations. Convolution operation 310 points a square with 60×60 along the sides, 1 in the lower left corner, and 5×5 in an inner square. This means there is 1 input image/feature to this operation, each input image/feature is 60×60, and the convolution kernel is 5×5. The convolution products an output indicated by the set of squares for the next operation, i.e., 20 images/features each of which is 56×56. (After non-linearity), this is also the input to max-pooling operation 320. The 2×2 square for max-pooling 320 indicates that max-pooling occurs over a 2×2 region, so there is a 2:1 down-sampling. The output of the max-pooling is 20 images/features each of which is 28×28, as indicated by the set of squares for convolution operation 330. And so on for the rest of the figure.

FIG. 3 is merely an example implementation of neural network level 232, which performs the initial prediction of inner landmark points. Each of the other neural network levels shown in FIG. 2 can be implemented by neural networks of similar architecture (or of different architecture). In particular, Level 1 includes two neural networks: the bounding box estimator 222 for inner landmark points and the bounding box estimator 224 for face contour points. Level 2 includes two neural networks: the initial prediction 232 for inner landmark points and the initial prediction 234 for face contour points. Level 3 has four neural networks, one for each of the landmarks shown. Level 4 also has four neural networks.

Figure 4:
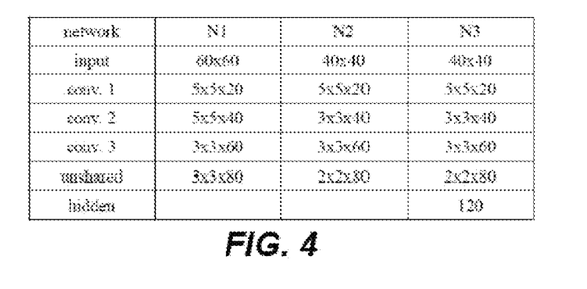
FIG. 4 is a table showing resolution, filter size and number of channels of various networks.

FIG. 4 provides a summary of the network architectures in an example convolutional neural network. The N1 network architecture is used for module 232, which makes the initial prediction of the inner landmark points. The N2 network architecture is used for module 234, which makes the initial prediction of the contour points. The N3 network architecture is used for each of the eight neural networks in Levels 3 (component refinement) and 4 (final refinement). Two fully connected layers are used in the N3 network and there are 120 hidden units between them. In N1 and N2, one fully connected layer directly connects the output units and the unshared convolutional layer. N1 has a larger input size than N2 because its input covers a range of the whole face.

In FIG. 4, the numbers N×N in the input row indicate the size of the input. For example, the N1 network takes inputs that are 60×60. For the rest of the rows, the numbers M×M×K mean that the filter size is M×M and the number of output images/features is K. For the N1 network, the first convolutional layer produces 20 different outputs, each of which is produced using a 5×5 convolution kernel.

The neural networks are trained by stochastic gradient descent with hand-tuned hyper-parameters. To avoid severe over-fitting, the image is randomly altered by slight similarity transformation (rotating, translating and scaling) before feeding into the network. This step creates virtually infinite number of training samples and keeps the training error close to the error on a validation set. In addition, the image is flipped to reuse the left eye's model for the right eye, and left eye-brow for right eye-brow.

Image patch is normalized to zero mean and unit-variance. Then a hyper-tangent function is applied so that the pixel values fall in the range of [−1,1]. When cropping the image inside a bounding box, the box is enlarged by 10% to 20%. More context information is retained by the enlargement, and it allows the system to tolerate small failures in the bounding box estimator 220. In the final refinement module 250, the rotation angle is computed from the position of two corner points in the facial component.

By utilizing cascaded neural networks, each neural network level is trained for specific tasks in mind in different levels, and good performance is achieved by networks of a moderate size. Rather than building a single very large network, the overall operation is separated into several component tasks, each of which can be implemented by a neural network of more manageable size. For example, the second level network learns the relative location of the facial components, and the learned relative location is passed by means of the bounding boxes to succeeding levels that handle the task of recognizing the shape of the components. Because global information is reflected in the earlier networks, the later networks which are susceptible to be compromised by local corruption do not cause as much drifting of the final prediction.

Operation of Face Recognition

Figure 5:
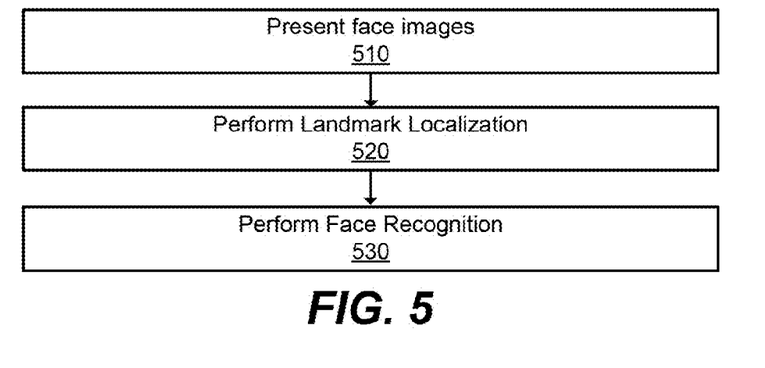
FIG. 5 is a flow diagram of a method of performing face recognition.

FIG. 5 illustrates a flow diagram of a method of performing face recognition using the face recognition system 100, according to one embodiment. The face recognition system 100 employs landmark localization for generating landmarks on face images 110. The landmark localization is presented 510 with face images 110. The landmark localization is performed 520 to identify facial landmarks on the face images 110. Face recognition is then performed 530 using the identified facial landmarks. For example, distances between landmarks, can be used to determine whether two face images 110 are for the same person.

Figure 6:
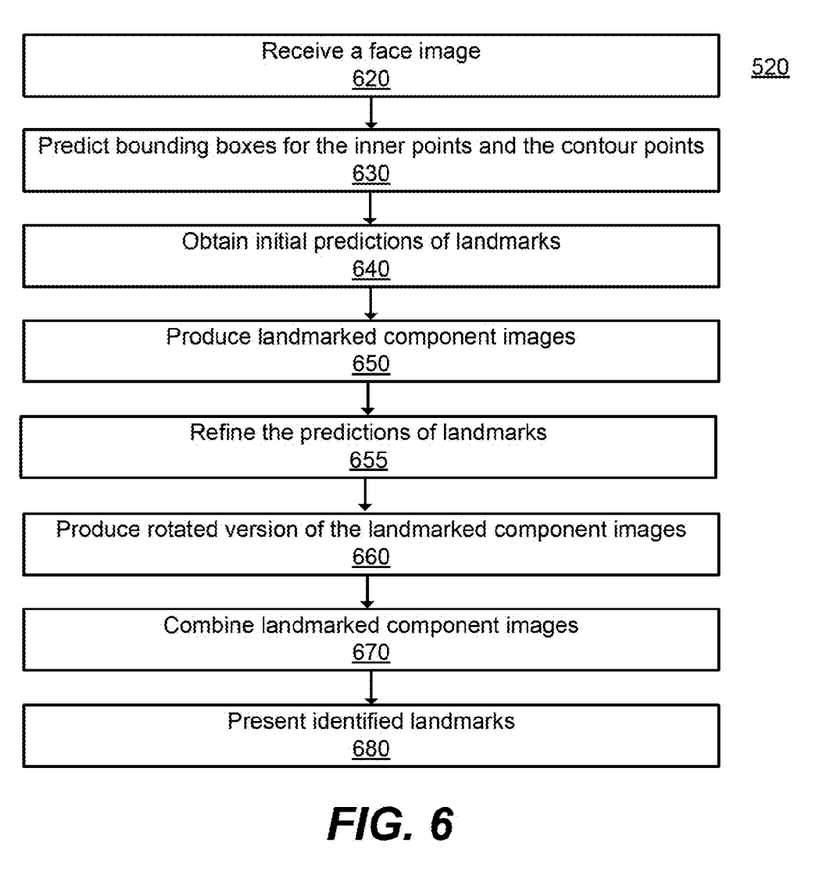
FIG. 6 is a flow diagram of a method of localizing facial landmarks.

FIG. 6 illustrates a flow diagram of a method of performing facial landmark localization 520. A face image is received 620 by a landmark localization module 120. The bounding boxes for inner points and for contour points are predicted 630. Initial predictions of landmarks are obtained 640 based on the images within the bounding boxes. Further, the landmarked component images are generated 650. The predictions of inner landmarks are refined 655, and refined landmarked component images are generated accordingly. The predictions of the inner landmarks are rotated 660. The landmarked component images are combined 670, and the identified landmarks are presented 680.

Simulation Results

Experiments are conducted on a dataset containing 3837 images provided by the 300-Faces in the Wild Challenge. The images and annotations come from AFW, LFPW, HELEN, and IBUG. A subset of 500 images is randomly selected as the validation set. An average distance between the predicted landmark positions and the ground truth normalized by inter-ocular distances is used as a performance metric. The average distance between the predicted landmark positions and the ground truth can be obtained as:

$$err = \frac{1}{N}\sum_{i=1}^{N} \frac{\frac{1}{M}\sum_{j=1}^{M}|p_{i,j} - g_{i,j}|_2}{|l_i - r_i|_2} \quad (5)$$

where M is the number of landmarks, p is the prediction, g is ground truth, l and r are the positions of the left eye corner and right eye corner. In addition, a cumulative error curve that plots the percentage of points against the normalized distance is used as another performance metric.

Figure 7:
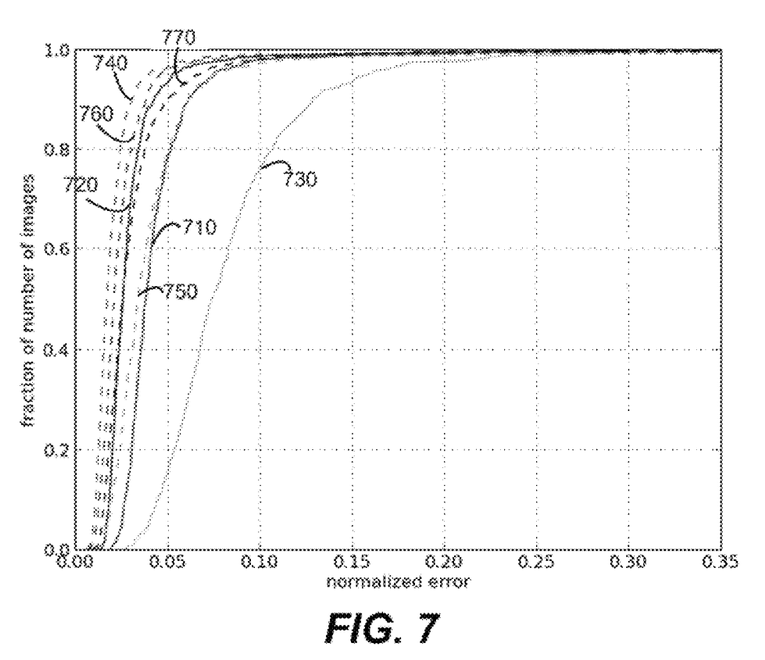
FIG. 7 plots cumulative errors on a validation set.

FIG. 7 plots cumulative errors on the validation set. The panel in FIG. 7 includes seven plots. Plot 710 is a cumulative error curve of the whole face (68 total landmark points). Plot 720 is a cumulative error curve of only the inner points (51 points). Plot 730 is a cumulative error curve of only the contour points (17 points). Plot 740 is a cumulative error curve of the landmarks for eyes. Plot 750 is a cumulative error curve of the landmarks for eyebrows. Plot 760 is a cumulative error curve of the landmarks for a nose. Plot 770 is a cumulative error curve of the landmarks for a mouth. As illustrated in FIG. 7, the validation error for the each facial component varies. The plot 730 is noticeably worse. Therefore, separating the inner landmarks and the face contour improves accuracy in landmark localization.

Another experiment is conducted in which three networks are trained. One of them, which has a larger size, predicts the 68 points together. The other two learned the contour points and inner points, respectively, and the sum of amount of computation involved in training and testing of the two networks roughly matches the larger network (68 points). Thus, there is no penalty in terms of calculation.

Figure 8:
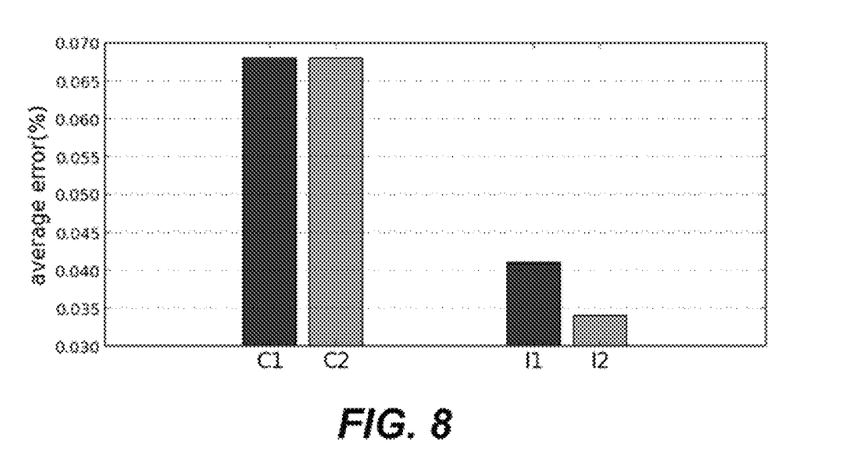
FIG. 8 illustrates the effect of separation of inner points and outer points.

FIG. 8 illustrates effect of separating inner points and outer points (i.e., contour points). One network predicts the face (68 points) together, and its errors on the inner points and contour points are I1 and C1 respectively. I2 and C2 are achieved by two networks that predict those points separately. As illustrated in FIG. 8, there is no significant performance difference on contour points C1 and C2, whether the contour points and the inner points are separated to perform facial landmark localization. Yet, there is a significant performance improvement in I2 by separating the contour parts and the inner landmarks to perform facial landmark localization.

Table 1 lists the validation errors achieved under various conditions. The error value is an average normalized distance between prediction and ground truth. The first two rows of data show the error calculated on the inner points only, while other rows correspond to the average error on all of the 68 points.

TABLE 1

Validation errors achieved under various conditions.

| output | error value |
| --- | --- |
| (51 points) detector box | 0.0662 |
| (51 points) Level 1 box | 0.0401 |
| Level 2 | 0.0510 |
| Level 3 | 0.0438 |
| Level 4 | 0.0431 |

The first row "(51 points) detector box" is the error value for the 51 inner points using a bounding box provided by the face detector. That is, the inner points are predicted using the full face input without any bounding box estimation (Level 1). The second row "(51 points) level 1 box" is the error value for the 51 inner points but using bounding box estimation (Level 1). This table indicates that performance is improved on the inner points by the bounding box estimated at the first level.

The remaining three rows are error values on all 68 landmark points, after Levels 2, 3 and 4. It can be seen that the error decreases with each additional level. That is, each level produces an estimate of the landmark points that is more accurate than the previous level. To quantitatively investigate the effect of the third and fourth level, the validation error achieved at each network level is calculated. Training separate networks for each component through cascaded stages allows the third level network to improve the performance by 14%. Performance gain is still obtained by the fourth level in which rotation is rectified.

Figure 9:
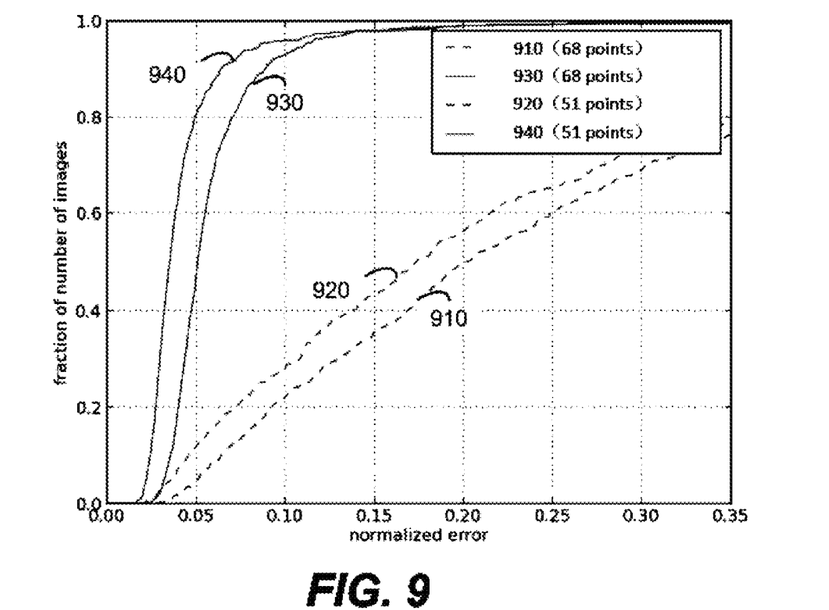
FIG. 9 plots cumulative errors on 300 faces in the wild challenge.

FIG. 9 illustrates the facial landmark localization result on the 300 faces in the wild challenge. AAM is used as a baseline for comparison in this experiment. The panel in FIG. 9 includes four plots. Plot 910 is a result obtained with full face (68 points) simulation using AAM. Plot 920 is a result obtained with inner landmarks (51 points) simulation using AAM. Plot 930 is a result obtained with full face (68 points) simulation using the facial landmark localization described above. Plot 940 is a result obtained with inner landmarks (51 points) simulation using the facial landmark localization described above. As illustrated in FIG. 9, the normalized error is much lower with the facial landmark localization compared to the landmark localization using AAM.

Figure 10:
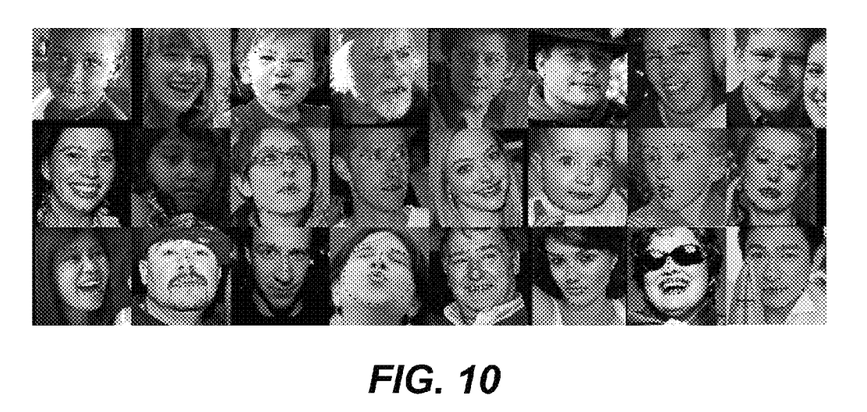
FIG. 10 shows face samples with landmarks in different face representation bins.

FIG. 10 provides examples taken from the validation set. The landmark localization as disclosed herein is able to handle images that contain great variation in pose and lighting condition. The system using the landmark localization using convolutional neural network as disclosed can predict the shape of the face even in the presence of occlusion.

Although the detailed description contains many specifics, these should not be construed as limiting the scope of the invention but merely as illustrating different examples and aspects of the invention. It should be appreciated that the scope of the invention includes other embodiments not discussed in detail above. For example, it should be apparent that different architectures can be used. The specific choices of number of convolution layers, filter sizes, number of channels, choice of non-linearity, choice of down-sampling, representation of the landmarks, etc. will vary depending on the application. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

In alternate embodiments, the invention is implemented in computer hardware, firmware, software, and/or combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

The term "module" is not meant to be limited to a specific physical form. Depending on the specific application, modules can be implemented as hardware, firmware, software, and/or combinations of these. Furthermore, different modules can share common components or even be implemented by the same components. There may or may not be a clear boundary between different modules.

Depending on the form of the modules, the "coupling" between modules may also take different forms. Dedicated circuitry can be coupled to each other by hardwiring or by accessing a common register or memory location, for example. Software "coupling" can occur by any number of ways to pass information between software components (or between software and hardware, if that is the case). The term "coupling" is meant to include all of these and is not meant to be limited to a hardwired permanent connection between two components. In addition, there may be intervening elements. For example, when two elements are described as being coupled to each other, this does not imply that the elements are directly coupled to each other nor does it preclude the use of other elements between the two.

What is claimed is:

1. A system for localizing landmarks on face images, the system comprising:
an input for receiving a face image;
an output for presenting landmarks identified by the system; and
a plurality of neural network levels coupled in a cascade from the input to the output; wherein each neural network level produces an estimate of landmarks that is more refined than an estimate of landmarks of a previous neural network level,
wherein the plurality of neural network levels comprise:
at least three cascaded neural network levels for predicting inner points defining landmarks within a face of the face image, the at least three cascaded neural network levels including the following in order from input to output:
a first bounding box estimator that receives the face image as input and produces a first cropped face image as output, the first cropped face image estimating a location of the face within the face image for purposes of estimating inner points,
a first initial prediction module that receives the first cropped face image as input and produces a first landmarked face image as output, the first landmarked face image containing an initial prediction of inner points within the face image, and
for each of the landmarks to be predicted, a component refinement module that receives the first landmarked face image as input and produces a landmarked component image as output, the landmarked component image containing a refined estimate of inner points defining the landmark, and
two cascaded neural network levels for predicting outer points defining a contour of the face of the face image, the two cascaded neural network levels including the following in order from input to output:
a second bounding box estimator that receives the face image as input and produces a second cropped face image as output, the second cropped face image estimating a location of the face within the face image for purposes of estimating outer points, and
a second initial prediction module that receives the second cropped face image as input and produces a second landmarked face image as output, the second landmarked face image containing a prediction of outer points within the face image.

2. The system of claim 1 wherein, for each neural network level, inputs to the neural network level are a same size or larger than outputs for the neural network level.

3. The system of claim 2 wherein, for each neural network level, an input to the neural network level is a clip of the face image with a first bounding box, an output for the neural network level is a clip of the face image with a second bounding box, and the first bounding box is a same size or larger than the second bounding box.

4. The system of claim 3 wherein the second bounding box is a subset of the first bounding box.

5. The system of claim 1 wherein one of the neural network levels receives a landmarked component image as input and produces a rotated version of the landmarked component image as output.

6. The system of claim 1 wherein the inner points include inner points defining eyes, mouth and nose.

7. The system of claim 1 wherein a number of neural network levels in cascade is different for different landmarks.

8. The system of claim 7 wherein a number of neural network levels in cascade for the inner points is greater than a number of neural network levels in cascade for the outer points.

9. The system of claim 1 wherein the neural network levels are convolutional neural networks that include convolution, non-linearity and down-sampling.

10. The system of claim 9 wherein each neural network level includes a convolutional neural network with at least two convolutional layers.

11. The system of claim 9 wherein the down-sampling is not more than 2× down-sampling.

12. The system of claim 1 wherein the system contains between three to five neural network levels in cascade.

13. A method for localizing landmarks on face images, the method comprising:
receiving a face image;
producing an estimate of landmarks of a neural network that is more refined than an estimate of landmarks of a previous neural network level in a cascaded neural network, wherein producing the estimate of landmarks comprises:
by at least three cascaded neural network levels of the cascaded neural network, predicting inner points defining landmarks within a face of the face image, predicting the inner points comprising:
by a first bounding box estimator, receiving the face image as input and producing a first cropped face image as output, the first cropped face image estimating a location of the face within the face image for purposes of estimating inner points,
by a first initial prediction module, receiving the first cropped face image as input and producing a first landmarked face image as output, the first landmarked face image containing an initial prediction of inner points within the face image, and
for each of the landmarks to be predicted, by a component refinement module, receiving the first landmarked face image as input and producing a landmarked component image as output, the landmarked component image containing a refined estimate of inner points defining the landmark, and
by two cascaded neural network levels of the cascaded neural network, predicting outer points defining a contour of the face of the face image, predicting the outer points comprising:
by a second bounding box estimator, receiving the face image as input and producing a second cropped face image as output, the second cropped face image estimating a location of the face within the face image for purposes of estimating outer points, and
by a second initial prediction module, receiving the second cropped face image as input and producing a second landmarked face image as output, the second landmarked face image containing a prediction of outer points within the face image; and
presenting landmarks identified based on the estimate of landmarks,
wherein the method is performed by one or more processors.

14. The method of claim 13, further comprising producing a rotated version of the landmarked component image.

15. The method of claim 13, wherein, for each neural network level, inputs to the neural network level are a same size or larger than outputs for the neural network level.

16. The method of claim 13, wherein the neural network levels are convolutional neural networks that include convolution, non-linearity and down-sampling.

17. A non-transitory computer readable medium configured to store program code, the program code comprising instructions for localizing landmarks on face images, the instructions when executed by a processor cause the processor to:
receive a face image;
produce an estimate of landmarks of a neural network that is more refined than an estimate of landmarks of a previous neural network level in a cascaded neural network, wherein the instructions to produce the estimate of landmarks further comprise instructions when executed by the processor cause the processor to:
by at least three cascaded neural network levels of the cascaded neural network, predict inner points defining landmarks within a face of the face image, wherein the instructions to predict the inner points further comprise instructions when executed by the processor cause the processor to:
by a first bounding box estimator, receive the face image as input and produce a first cropped face image as output, the first cropped face image estimating a location of the face within the face image for purposes of estimating inner points,
by a first initial prediction module, receive the first cropped face image as input and produce a first landmarked face image as output, the first landmarked face image containing an initial prediction of inner points within the face image, and
for each of the landmarks to be predicted, by a component refinement module, receive the first landmarked face image as input and produce a landmarked component image as output, the landmarked component image containing a refined estimate of inner points defining the landmarks, and
by two cascaded neural network levels of the cascaded neural network, predict outer points defining a contour of the face of the face image, wherein the instructions to predict the outer points further comprise instructions that when executed by the processor cause the processor to:
by a second bounding box estimator, receive the face image as input and produce, at the second bounding box estimator, a second cropped face image as output, the second cropped face image estimating a location of the face within the face image for purposes of estimating outer points, and
by a second initial prediction module, receive the second cropped face image as input and produce a second landmarked face image as output, the second landmarked face image containing a prediction of outer points within the face image; and
present landmarks identified based on the estimate of landmarks.

18. The non-transitory computer readable medium of claim 17, further comprising instructions when executed by the processor cause the processor to produce a rotated version of the landmarked component image.

19. The non-transitory computer readable medium of claim 17, wherein, for each neural network level, inputs to the neural network level are a same size or larger than outputs for the neural network level.

20. The non-transitory computer readable medium of claim 17, wherein the neural network levels are convolutional neural networks that include convolution, non-linearity and down-sampling.

* * * * *